April 9, 1940.  E. H. LEHMAN  2,196,315
FRICTION SHOCK ABSORBING MECHANISM
Filed July 9, 1937  2 Sheets-Sheet 1
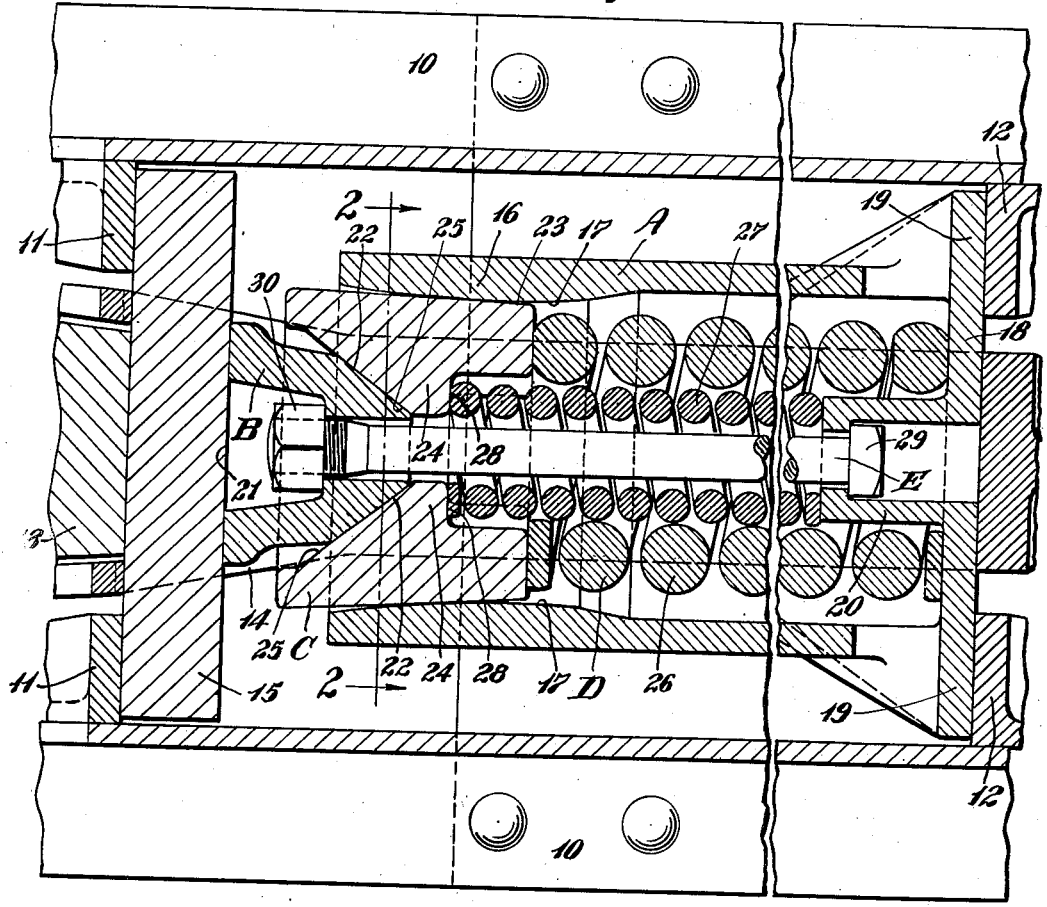
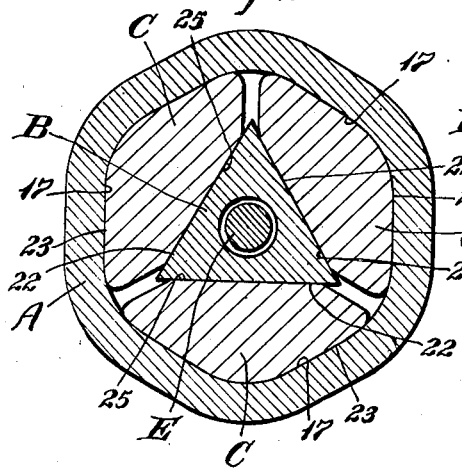
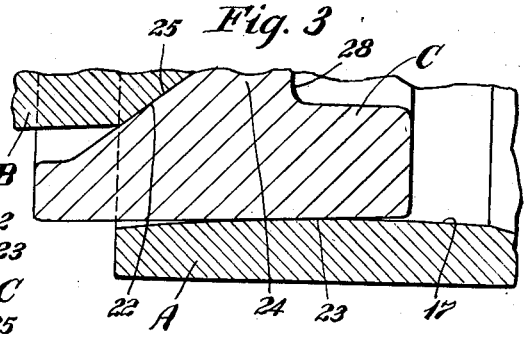
Inventor
Edward H. Lehman
By Henry Fuchs
Atty.

April 9, 1940.　　　　E. H. LEHMAN　　　　2,196,315
FRICTION SHOCK ABSORBING MECHANISM
Filed July 9, 1937　　　2 Sheets-Sheet 2
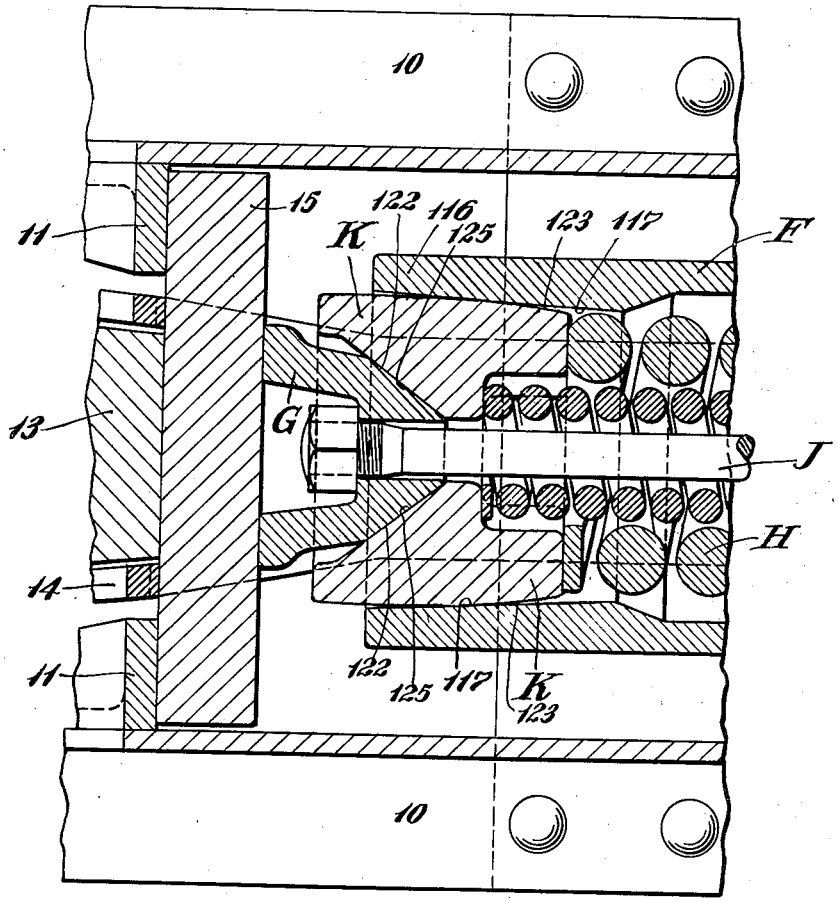
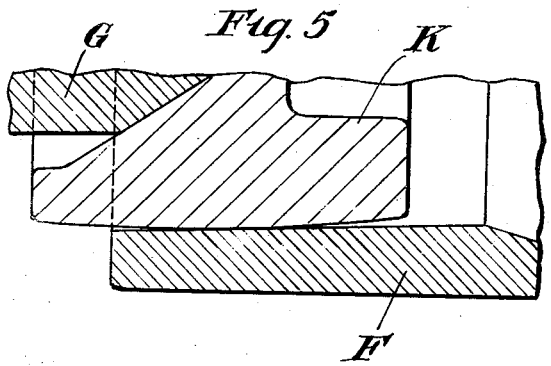
Inventor
Edward H. Lehman
By Henry Fuchs
Atty.

Patented Apr. 9, 1940

2,196,315

UNITED STATES PATENT OFFICE 2,196,315

FRICTION SHOCK ABSORBING MECHANISM

Edward H. Lehman, Chicago, Ill., assignor to W. H. Miner, Inc., Chicago, Ill., a corporation of Delaware Application July 9, 1937, Serial No. 152,680

2 Claims. (Cl. 213—32)

This invention relates to improvements in friction shock absorbing mechanisms.

More specifically the invention relates to friction shock absorbing mechanisms wherein are employed a wedge friction system including a friction casing and a friction clutch cooperating with the casing.

As is well known to those skilled in the art in the manufacture of friction shock absorbing mechanisms of the character indicated, it is difficult to obtain uniformity in the manufacture of friction casings due to unavoidable variations in the latter incident to the manner of forming such casings. In the case of the friction clutch which is composed of friction shoes and a wedge block, the latter being usually drop-forged, accurate results are obtainable. The casings which are made in the form of steel castings present a more difficult problem inasmuch as in foundry operations certain working variations must be allowed for in commercial practice. On account of the working variations allowed, slight inaccuracies occur in the interior of the casing which materially affect efficient operation of the gear in that the coacting wedge faces and coacting friction surfaces of the mechanism are thrown out of alignment with the result that the gear will not function properly. In case of the interior of the casing machining is relatively difficult and too expensive to receive practical consideration, and therefore the accuracy of manufacture of the friction casing is dependent entirely upon the molding and casting without other appreciable finishing.

One object of my invention is to provide a simple expedient which does not involve any increased expense in cost of manufacture by which the friction clutch and cylinder are fitted to each other through operation of the mechanism, thereby compensating for the unavoidable inaccuracies in the casing due to allowable foundry variations which occur in common commercial practice.

A more specific object of the invention is to provide in that type of friction shock absorbing mechanism having a friction casing provided with interior friction surfaces, a friction clutch cooperating with the friction surfaces of the casing, and a spring opposing relative movement of the clutch and casing, wherein the clutch is composed of a central wedge block and friction shoes surrounding said block, the block and shoes having flat engaging wedge faces, an expedient for fitting the friction surfaces of the clutch to the friction surfaces of the casing to obtain true surface contact therebetween regardless of the unavoidable variations which occur in the casing as hereinbefore pointed out while maintaining true contact between the wedge faces of the wedge and shoes of the friction clutch.

A still further object of the invention is to provide a process or method by which the coacting friction surfaces of the friction clutch and casing of a mechanism of the character hereinbefore referred to are worn in to obtain true surface contact therebetween, whereby permitted foundry variations in commercial practice will be automatically compensated for.

My invention further consists in the improvements in the parts and devices, the novel combination of the parts and devices, and the novel steps of the process hereinafter described and made subject of the claims.

Other objects of the invention will more clearly appear from the description and claims hereinafter following.

In the drawings forming a part of this specification, Figure 1 is a longitudinal, sectional view of a portion of a railway draft rigging, illustrating my improvements in connection therewith, the section through the casing and friction elements corresponding to two intersecting planes at 120° with respect to each other. Figure 2 is a transverse, vertical, sectional view, corresponding substantially to the line 2—2 of Figure 1. Figure 3 is a longitudinal, sectional view, on an enlarged scale, of a wedge shoe and portions of the friction casing, and the main wedge. Figure 4 is a view similar to Figure 1, partly broken away, illustrating another embodiment of the invention. Figure 5 is a longitudinal, sectional view, on an enlarged scale, of one of the wedge shoes and portions of the casing and main wedge shown in Figure 4.

In said drawings 10—10 indicate channel-shaped center or draft sills of a railway car underframe, to the inner sides of which are secured front stop lugs 11—11 and rear stop lugs 12—12. The inner end portion of the shank of the usual coupler is indicated by 13, to which is connected a hooded yoke 14. Within the yoke is carried the improved shock absorbing mechanism and a main front follower 15. The front follower 15 cooperates with the front stop lugs 11—11 in the usual manner.

Referring first to the embodiment of the invention illustrated in Figures 1, 2, and 3, the improved shock absorbing mechanism comprises broadly a friction casing A having longitudinally convexed interior friction surfaces; a wedge block B; three friction shoes C—C—C; a spring resistance D; and a retainer bolt E.

The casing A is of substantially hexagonal exterior cross section and is open at the forward end. The friction shell section of the casing, which is indicated by 16, is at the forward end thereof. Said friction shell section is of substantially hexagonal interior cross section and presents three longitudinally disposed interior friction surfaces 17—17—17 of V-shaped transverse cross section, said surfaces converging slightly inwardly of the casing. The two faces of the sections of each V-shaped surface are crowned or convexly curved in a direction lengthwise of the casing for a purpose hereinafter pointed out. Rearwardly of the friction shell section 16, the casing A provides a spring cage portion which is closed at the rear end by a vertical transverse wall 18 extending laterally beyond opposite sides of the casing, thereby providing flanges 19—19 which cooperate with the rear stop lugs 12—12 in the manner of the usual rear follower. Inwardly projecting from the wall 18 is a hollow boss 20 for a purpose hereinafter pointed out.

The wedge B is in the form of a hollow block having a flat front end face 21 which bears on the front follower 15, and three flat wedge faces 22—22—22 at the inner end thereof arranged symmetrically about the longitudinal axis of the mechanism and converging inwardly of the length of said mechanism.

The friction shoes C—C—C are arranged symmetrically about the central longitudinal axis of the mechanism. Each shoe has an outer friction surface 23 of substantially V-shaped cross section cooperating with one of the V-shaped friction surfaces 17 of the casing. The faces of the two sections of each V-shaped surface 23 are substantially flat and correspondingly inclined to the sections of the corresponding V-shaped surface 17 of the casing. On the inner side each shoe C has a lateral enlargement 24 provided with a front wedge face 25 which is flat and correspondingly inclined to the face 22 of the wedge with which it is engaged. The friction shoes together with the wedge B provide a friction clutch which cooperates with the friction shell section of the casing to provide frictional resistance as the clutch is moved inwardly of the shell.

The spring resistance D comprises a relatively heavy outer coil 26 and a lighter inner coil 27 which are interposed between the shoes C—C—C and the rear end of the casing A. The spring 26 bears at its front and rear ends respectively on the inner ends of the shoes and the inner face of the rear wall 18 of the casing, and the spring 27 bears at its front end on transverse shoulders 28—28—28 on the shoes and at its rear end on the front portion of the hollow boss 20.

The retainer bolt E is headed at its rear end, as indicated at 29, and is anchored to the hollow boss 20, said headed portion having interior shouldered engagement with said boss. The bolt extends through the inner coil of the spring D, between the shoes, and through a suitable opening in the wedge block B and is anchored at its front end to said block by a nut 30 threaded on the bolt and seated in a pocket provided in said block. The bolt E serves to hold the mechanism assembled and maintains the same of uniform overall length. The bolt is so adjusted as to hold the mechanism under initial compression, thereby compensating for wear of the friction surfaces and wedge faces of the gear.

The operation of my improved mechanism as illustrated in Figures 1 to 3 inclusive, assuming a compression action thereof due to either a buffing or draft stroke of the coupler or drawbar, is as follows, detailed consideration of the convex inclined friction surfaces being omitted at this time: As the wedge B is forced inwardly of the casing A, the shoes C—C—C will be carried inwardly therewith against the resistance of the spring D. During this action the shoes are forced into tight frictional engagement with the friction surfaces 17—17—17 of the casing A due to the spreading force exerted by the cooperating wedge faces of the wedge B and the shoes C—C—C. Frictional resistance is thus produced to absorb the shocks. Inasmuch as the friction surfaces of the casing A are converged inwardly, the resistance offered is increased, differential action being effected between the wedge B and the shoes C—C—C.

When the actuating force is reduced, the expansive action of the spring D returns the shoes C—C—C and the wedge B to the normal full release position shown in Figure 1, outward movement of the wedge being limited by the retainer bolt E, and the wedge in turn limiting outward movement of the shoes.

As will be evident, the wedge B and the shoes C—C—C form an expandible and contractible friction clutch which is slidable on the interior friction surfaces of the casing.

Referring more specifically to the operation and functioning of the convex or crowned surfaces 17—17—17 of the casing A and the flat faces 23—23—23 of the friction shoes C—C—C of the clutch: In commercial practice a variation of two degrees in taper of the casing friction surfaces in a device of the kind disclosed is permitted. In carrying out my invention as disclosed in Figures 1, 2, and 3, the radius of curvature of the convex surface 17 is made relatively long and of such a length that it will accommodate variations within the two degrees above referred to, that is, assuming the maximum variation in one direction, contact will be insured between the curved surface 17 and the flat surface 23 near the inner ends thereof; assuming the limit of variation in the opposite direction, contact will be assured between the curved surface 17 and the flat surface 23 near their outer ends; a casing formed with the friction surface tapered accurately as designed will insure contact at substantially the centers of the curved surface 17 and flat surface 23; and variations intermediate the points referred to will insure contact between the extreme limits mentioned. In all of the positions referred to, the adjustment provided assures true flat contact between the wedge faces of the wedge block B and shoes C—C—C of the friction clutch.

When the parts of the friction shock absorbing mechanism are assembled, there will be, theoretically, only line contact between each set of surfaces 17 and 23, but, as soon as the device is compressed once, this theoretical line of contact will immediately be widened into a surface contact of appreciable width, and as two or three or four additional compressions of the mechanism occur, the area of contact is correspondingly increased or widened until a sufficiently large area is obtained to insure proper functioning of the parts. As will be evident, this widening of the area of contact of the friction surfaces is effected through the enormous pressure exerted by the wedge and the sliding action of the friction shoes on the friction surfaces of the casing A, the friction surfaces 17—17—17 of the casing being ironed out or worn down until true flat contact is obtained. Adjustment of the parts of the friction clutch to compensate for this ironing out or flattening of the friction surfaces of the shoes to prevent looseness of the parts after several actuations of the mechanism is had by placing the spring D under initial compression through adjustment of the retainer bolt E, the initial compression of the spring permitting the same to expand to keep the shoes tight against the wedge and the friction surfaces of the casing at all times.

Referring next to the embodiment of the invention illustrated in Figures 4 and 5, the construction is substantially the same as that hereinbefore described in connection with Figures 1, 2, and 3, with the exception that the friction surfaces of the casing are substantially flat instead of convex, and that the friction surfaces of the shoes are crowned or convex instead of flat.

The casing, which is indicated by F, is identical with the casing A with the exception that the interior V-shaped friction surfaces 117 of the casing F are substantially flat lengthwise of the mechanism. These surfaces 117 converge inwardly of the casing and provide a friction shell section 116 of inwardly tapered formation. The wedge block, which is indicated by G, is identical with the wedge block B, hereinbefore described. The spring and the retainer bolt, which are indicated respectively by H and J, are also identical with the spring D and the bolt E, hereinbefore described.

The three friction shoes, which are indicated by K—K—K, correspond to the friction shoes C—C—C, hereinbefore described, except as hereinafter pointed out, each shoe having a flat wedge face 125 in wedging engagement with one of the flat wedge faces 122 of the wedge block G. Each shoe K is provided with a longitudinally extending V-shaped friction surface 123 on the outer side thereof which is convexed in a longitudinal direction, as shown in Figures 4 and 5. The convex surface 123 is inclined similarly to the casing friction surface 117 with which it cooperates. The radius of curvature of the convex surface 123 is made relatively long and of such a length that it will accommodate variations within the two degrees of taper of the casing hereinbefore referred to in connection with the form of the invention described in connection with Figures 1, 2, and 3, that is, assuming the maximum variation in one direction, contact will be insured between the curved surface 123 and the flat surface 117 near the inner ends thereof; assuming the limit of variation in the opposite direction, contact will be assured between the curved surfaces 123 and the flat surfaces 117 near their outer ends; a casing formed with the friction surface tapered accurately as designed will insure contact substantially at the centers of the curved surfaces 123 and the flat surfaces 117; variations intermediate the points referred to will insure contact between the extreme limits mentioned. True surface contact between the surfaces 123 and 117 is obtained in exactly the same manner as described hereinbefore in connection with the surfaces 17 and 23 of the form of the invention illustrated in Figures 1, 2, and 3, the action being merely reversed in that the surface of the shoe is flattened out instead of the surfaces of the casing being flattened.

In both forms of the invention described, the process of fitting of the parts to compensate for permissible foundry variations can obviously be accomplished in the usual test of the gear before being shipped and applied to the car. From the foregoing it will be observed that my improvements permit of automatic compensation of the parts even though the variation in inclination of one casing friction surface may differ from the variation found in any other friction surface thereof. It will also be obvious that no increase in cost of manufacture of any of the parts, as compared with a device of similar type, is involved, and that the parts will automatically adjust themselves and produce the desired results as hereinbefore indicated.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior friction surfaces at the front end thereof disposed about the longitudinal axis of the casing, said surfaces extending lengthwise of the casing in converging relation rearwardly thereof; of a spring resistance within the casing; a plurality of friction shoes within the casing movable inwardly toward the rear of the casing to the full extent of the compression stroke of the mechanism, said inward movement being opposed by said spring resistance, said shoes corresponding in number to said casing friction surfaces, each shoe having a flat friction surface on the outer side thereof in contact with one of said casing friction surfaces and slidable inwardly thereon lengthwise of the casing; and a central wedge block between said shoes, said wedge block and shoes having engaging flat wedge faces, the friction surfaces of said casing being slightly convex in lengthwise direction, the curvature of said last named friction surfaces extending from the front to the rear ends of said surfaces and being relatively small, whereby, when the parts are initially assembled, contact of relatively minute area is had between said friction surfaces of the shoes and casing to compensate for variations within predetermined limits, said convex surfaces being flattened through actuation of the mechanism to thereby increase the area of contact of said surfaces and produce true contact therebetween.

2. In a friction shock absorbing mechanism, the combination with a friction casing having a friction shell section at the front end thereof and a spring cage section rearwardly of said friction shell section; of a spring resistance within the spring cage section of said casing; and a friction clutch within the friction shell section of the casing including a central wedge block and a plurality of friction shoes surrounding said wedge block, said wedge block having wedging engagement with the friction shoes, said friction clutch being movable inwardly of the friction shell section of the casing lengthwise of the latter to the full extent of the compression stroke of the mechanism, said movement in direction inwardly of the casing being opposed by said spring resistance, said friction shell having a plurality of interior friction surfaces disposed about the longitudinal axis of the shell, said surfaces extending lengthwise of the casing in rearwardly converging relation, said friction shoes corresponding in number to said casing friction surfaces, there being one shoe for each casing friction surface, each friction shoe having a friction surface on the outer side thereof extending in a direction lengthwise of the casing and opposed to and in contact with the corresponding casing friction surface, one of each of said two opposed friction surfaces being slightly convex in direction lengthwise of the casing, the curvature of said convex surfaces being relatively small, whereby, when the parts are initially assembled, contact of relatively minute area is had between said two opposed friction surfaces to compensate for variations within predetermined limits, said convex surfaces being flattened through actuation of the mechanism to thereby increase the area of contact of said surfaces and produce true contact therebetween.

EDWARD H. LEHMAN.